UNITED STATES PATENT OFFICE.

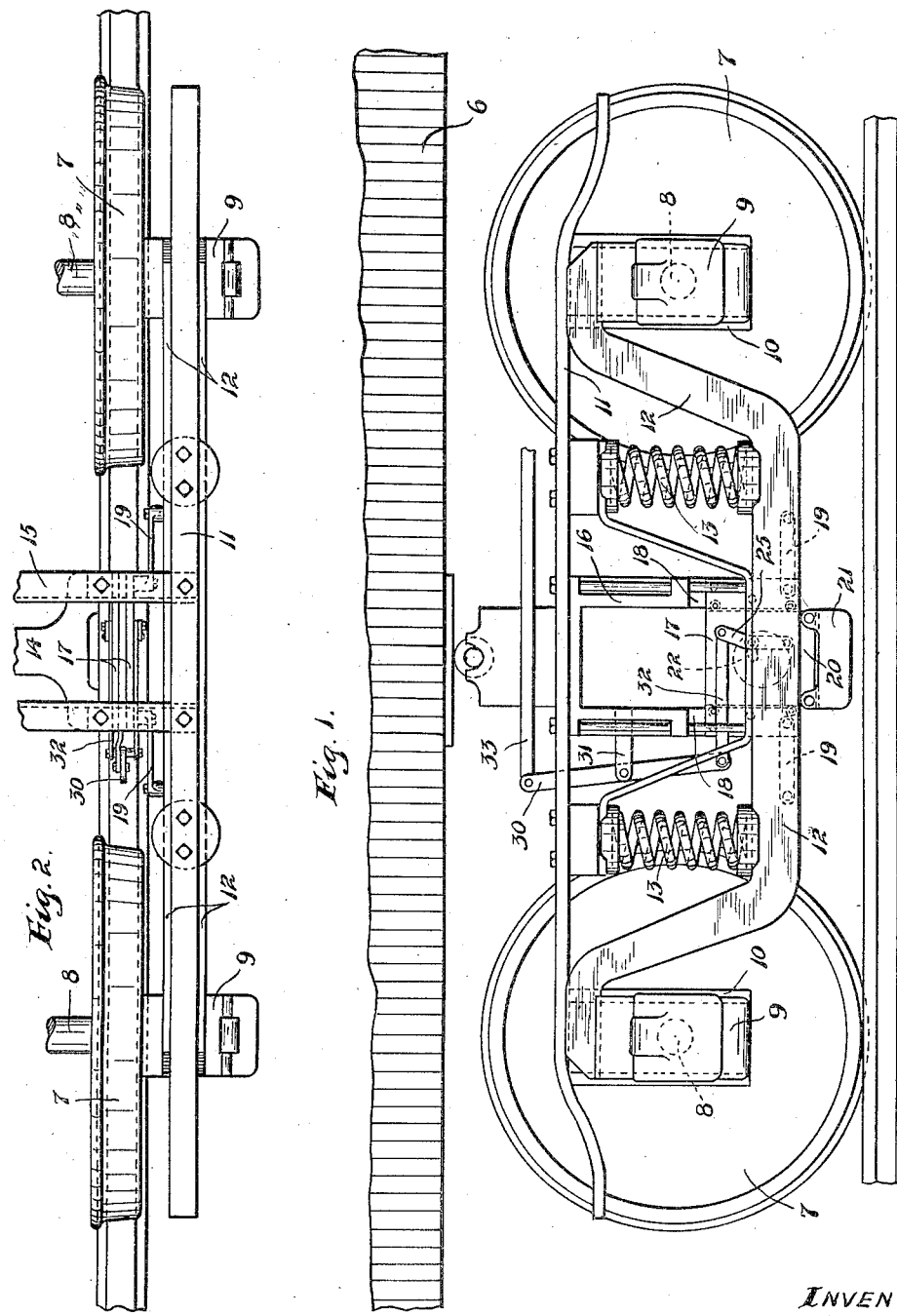

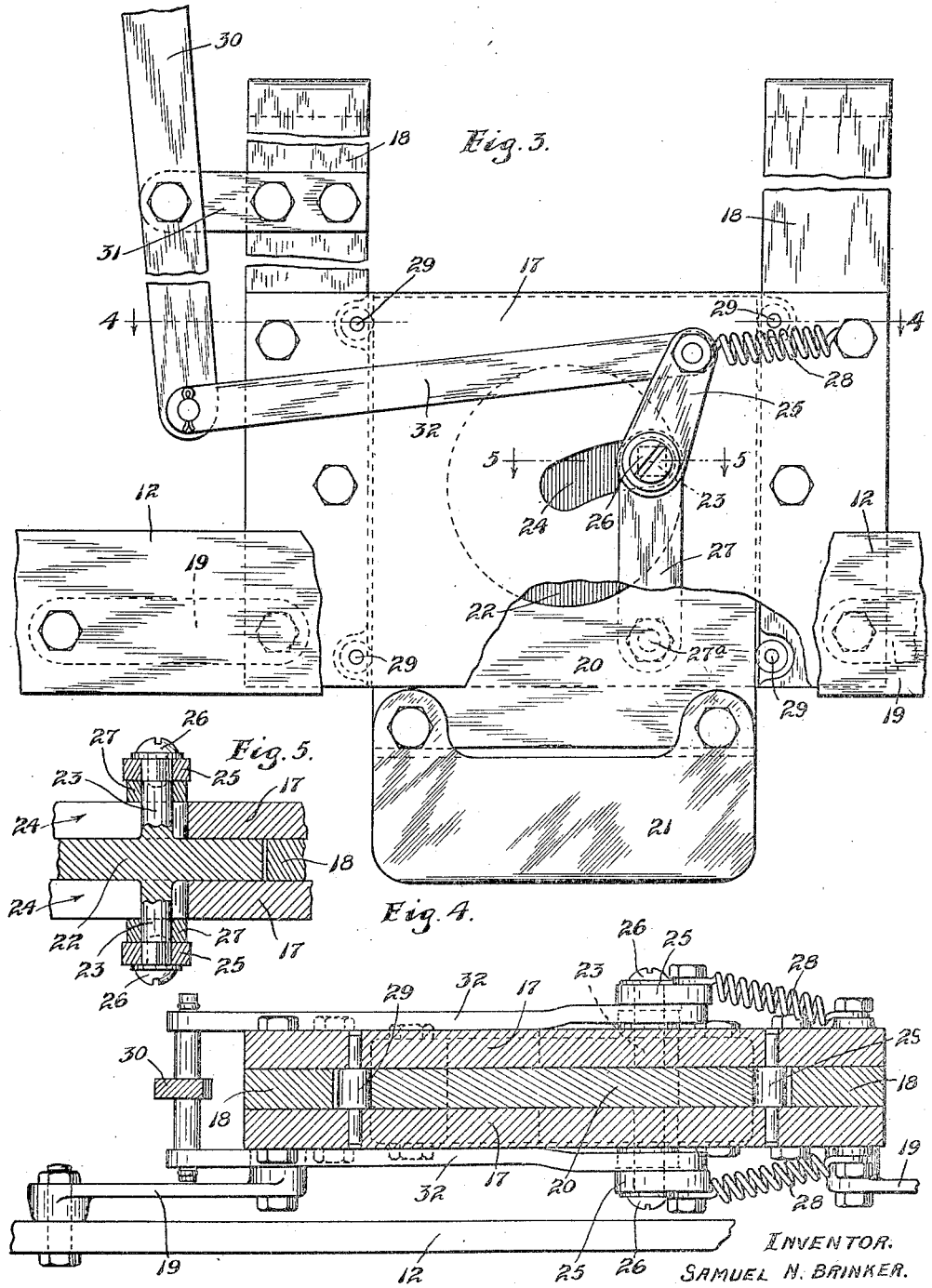

SAMUEL N. BRINKER, OF MINNEAPOLIS, MINNESOTA.

CAR-BRAKE.

1,346,171. Specification of Letters Patent. Patented July 13, 1920.

Application filed September 22, 1919. Serial No. 325,317.

*To all whom it may concern:*

Be it known that I, SAMUEL N. BRINKER, a citizen of the United States, residing at Minneapolis, in the county of Hennepin and State of Minnesota, have invented certain new and useful Improvements in Car-Brakes; and I do hereby declare the following to be a full, clear, and exact description of the invention, such as will enable others skilled in the art to which it appertains to make and use the same.

My invention has for its object to provide an improved car brake in which the brake shoe will frictionally engage the rail, thus eliminating the brake shoes that engage with the wheels. Generally stated, the invention consists of the novel devices and combinations of devices hereinafter described and defined in the claims.

It is a well known fact that great expense and inconvenience is produced in car service by setting of brake shoes against wheels with such friction that the wheels will slide on the rails, thus flattening the wheels and requiring the wheels to be removed from the car and returned. This slipping of the wheels on the rails is due to the fact that the shoes have much greater bearing surface against the wheel than the wheels have against the rail.

My invention provides a novel arrangement of a brake shoe mounted on a truck frame for engagement with the rail and combined with novel means for vertically moving the shoe to and from the rail.

The invention is illustrated in the accompanying drawings wherein like characters indicate like parts throughout the several views. Referring to the drawings:

Figure 1 is a fragmentary view in side elevation showing one of the trucks and a portion of the body of a car equipped with one of my improved brake devices;

Fig. 2 is a plan view of the parts shown in Fig. 1, illustrating only such parts as are at one side of the car truck, and the body of the car being removed;

Fig. 3 is an enlarged view showing the brake device and parts of the car truck in side elevation, some parts being broken away;

Fig. 4 is a horizontal section taken approximately on the line 4—4 of Fig. 3; and Fig. 5 is a detail in section on the line 5—5 of Fig. 3.

The truck body is indicated by the numeral 6, and the wheels of the truck by the numeral 7. Wheels 7 are on axles 8 journaled in boxes 9 mounted to move in pedestal brackets 10 of truck side frames which comprise top bars 11, equalizing bars 12, interposed springs 13 and certain other elements, all of which parts are, or may be of standard construction. Also, the two side frames, as is customary, will be connected by cross transoms 14 and 15, the ends of which latter are, in the customary way, secured to laterally spaced bolster columns 16 rigidly secured to the side frame structures in any suitable well known manner.

For the application of my improved brake, for each side truck between the wheels thereof, laterally spaced vertical bearing plates 17 are rigidly secured to the bolster columns 16. Preferably, and as shown, this is accomplished by bolting the vertical edges of the said bearing plates 17 to the lower ends of interposed vertical spacing bars 18, the upper ends of which are rigidly secured to the said bolster columns 16. To brace the bearing plates 17 against forward and rearward movements, thrust links 19 are pivoted thereto at their inner ends, and at their outer ends are pivoted to the equalizer bar 12. Mounted to slide vertically in the space between the bearing plates 17 and between the spacing strips 18 is a rectangular plate-like shoe carrier 20, to the lower end of which is detachably secured a rail-engaging brake shoe 21. At its central portion, the shoe carrier 20 has a large circular perforation in which is journaled a disk-like eccentric 22. This eccentric 22, near its periphery, is rigidly secured to a shaft 23 that projects therefrom, both inwardly and outwardly and extends through segmental slots 24 of the bearing plate 17. The outer ends of eccentric shaft 23 are shown as squared and passed through square seats in the lower ends of short crank arms 25 held thereto by screws 26, or otherwise. Links 27, at their upper ends, are loosely pivoted on the ends of eccentric shaft 23 just inward of arms 25. The links 27, at their lower ends are pivoted to the bearing plates 17 at 27ª. Here it should be noted that the segmental slots 24 are on the arc of a circle struck from the pivot 27ª and that they extend to the center or axis of rotation of the eccentric 22.

Coiled springs 28 attached to arms 25 and anchored to the bearing plates 17 normally and yieldingly hold arms 25 to the right, in respect to Figs. 3 and 4, and hence, normally hold the brake shoes raised from the rail, as best shown in Fig. 4. To decrease the frictional engagement between the vertical edges of the shoe carrier 20 and its guide, anti-friction rollers 29 are journaled to the bearing plates 17 in position to engage the vertical edges of said carrier plate 20. Brake shoes will be thrown down into engagement with the rails, or in other words, the brake will be set by force applied to move the crank arms 25 toward the left, in respect to Fig. 3. Such movement of the arms 25, because they are rigidly connected to the eccentrics 22, will cause the eccentrics to rotate on their centers, and, inasmuch as the eccentric shaft 23 cannot move upward, it follows that the eccentric 22, when thus rotated, will move the shoe carrier 20 and the shoe 21 downward. Under such movement, the eccentric shaft 23 will move on the arc of a circle struck from the pivot 27$^a$ and hence, will move in the slots 24 to or toward the centers of the respective eccentrics 22.

The brake connections for moving the arms 25 may be of the standard or well known arrangement, and as illustrated, such connections include a lever 30 intermediately pivoted to a bearing 31 on one of the bars 18. There is one lever 30 for each side of the truck, or for each brake device. The lower end of each such lever is connected by a link 32 to a free end of the coöperating crank arm 25, and the upper end of the lever 30 will be connected to and operated by a rod 33 that is one of the elements of the customary air brake equipment.

With the above described arrangement, as is evident, when the air brake or other mechanism, is operated to set the brakes, brake shoes, of which there will be one for each truck side frame, will be thrown downward into contact with the rail, and the friction, due to stopping of the car, will be taken entirely between the brake shoes and rails and the wheels of the car will not be subjected to any of the brake setting strain, but are free to rotate without slippage. In fact, the frictional contact between the wheels and rails will be somewhat reduced by the brake setting action, because the load of the car will be partly transferred onto the brake shoes. The brake shoes used in this brake mechanism may be long and have a very extended frictional contact with the rails, so that the wear will not be excessive, and moreover, the brake shoes may be very easily replaced when badly worn. Brake shoes of this character will have less destructive action on the rails than the wheels that are caused to slide on rails, and obviously, the running life of the wheels will be very greatly increased beyond the life of ordinary wheel upon which brake shoes are arranged to operate. Also, by brake mechanism of this character, cars may be very quickly brought to a dead stop and will thus serve both as ordinary brakes and as emergency brakes. The quickness in which the car will be stopped will be dependent entirely upon the pressure put upon the brakes. In stopping cars by the setting of brakes against the wheels and the quickness at which the car will be stopped, is not by any means always dependent upon the pressure put upon the brakes, because when the wheels are caused to slide further brake pressure will be without effect. With the improved brake mechanism described, however, the shoe not only has a very extended engagement with the rail, but always slides on the rail, and the speed at which the car will be stopped will depend entirely upon the pressure, up to the point where the entire weight of the car is thrown upon the brake shoes.

What I claim is:

1. In a car truck, the combination with truck side frames and wheels, of vertically movable shoe carriers equipped with shoes engageable with the rails between wheels, guides for said shoe carriers secured in respect to coöperating truck side frames, eccentrics journaled to said shoes, levers mounted on pivots fixed in respect to the said side frames and pivotally connected to the respective eccentrics at points eccentric to the axes thereof, said levers being movable toward and from the axis of the respective eccentrics, and brake connections to said levers for oscillating the same to throw said shoes into and out of action.

2. In a car truck, the combination with truck side frames and wheels, of vertically movable shoe carriers equipped with shoes engageable with the rails between the wheels, guides for said shoe carriers secured in respect to coöperating truck side frames, eccentrics journaled to said shoes, upright levers pivoted at their lower ends to said shoe guides and movable toward and from the axes of said eccentrics, said levers being pivotally connected to said eccentrics at points offset from their centers, springs for yieldingly moving said levers in one direction, and brake connections for moving said levers in the opposite directions, the latter movement serving to set the brake shoes against the rails.

3. In a car truck, the combination with truck side frames and wheels, of vertically movable shoe carriers equipped with shoes engageable with the rails between wheels, guides for said shoe carriers secured in respect to coöperating truck side frames, eccentrics journaled to said shoes, said eccentrics having projecting shafts offset from the centers, and said shoe guides having slots through which said shafts work freely, levers arranged in pairs pivotally connected to said shoe guides at their lower ends and intermediately pivoted to the shaft of said eccentrics, and brake connections for oscillating said pairs of levers.

In testimony whereof I affix my signature in presence of two witnesses.

SAMUEL N. BRINKER.

Witnesses:
　Eva E. König,
　Harry D. Kilgore.